(12) United States Patent
Liu et al.

(10) Patent No.: US 11,372,192 B2
(45) Date of Patent: Jun. 28, 2022

(54) OPTICAL MEMBER DRIVING MECHANISM

(71) Applicant: TDK TAIWAN CORP., Taoyuan (TW)

(72) Inventors: Shou-Jen Liu, Taoyuan (TW); Chia-Hsiu Liu, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 266 days.

(21) Appl. No.: 16/845,824

(22) Filed: Apr. 10, 2020

(65) Prior Publication Data

US 2020/0241236 A1 Jul. 30, 2020

Related U.S. Application Data

(63) Continuation of application No. 15/915,525, filed on Mar. 8, 2018, now Pat. No. 10,649,172.

(30) Foreign Application Priority Data

Mar. 30, 2017 (TW) .................................. 106110738

(51) Int. Cl.
*G02B 7/02* (2021.01)
*G02B 7/04* (2021.01)
*H02K 41/035* (2006.01)
*G02B 7/08* (2021.01)

(52) U.S. Cl.
CPC .................. *G02B 7/04* (2013.01); *G02B 7/08* (2013.01); *H02K 41/0354* (2013.01)

(58) Field of Classification Search
CPC . G02B 7/09; G02B 7/08; G03B 13/36; G03B 2205/0007; G03B 2205/0069; H02K 41/0356

USPC ........................ 359/811, 819, 822, 823, 824
See application file for complete search history.

(56) References Cited

FOREIGN PATENT DOCUMENTS

| CN | 101923201 A | 12/2010 | |
|---|---|---|---|
| JP | 2016024832 A | * 2/2016 | ......... G11B 7/08582 |

OTHER PUBLICATIONS

Office Action dated Feb. 8, 2018 in corresponding TW Application No. 106110738 (5 pages).

* cited by examiner

*Primary Examiner* — William Choi
(74) *Attorney, Agent, or Firm* — Muncy, Geissler, Olds & Lowe, P.C.

(57) ABSTRACT

A lens driving module for holding and moving a lens is provided, including a lens holder, a first electromagnetic driving assembly disposed on the lens holder, a base, a second electromagnetic driving assembly disposed on the base, and a first elastic member. The lens holder has an accommodating space and a first surface, and the lens is disposed in the accommodating space. The base has a connecting surface and a first contacting surface. The connecting surface and the first contacting surface are coplanar. The second electromagnetic driving assembly is adjacent to the first electromagnetic driving assembly, and the first elastic member is connected to the connecting surface and the lens holder. When the lens holder contacts the base, the first surface contacts the first contacting surface.

20 Claims, 9 Drawing Sheets

OPTICAL MEMBER DRIVING MECHANISM

CROSS REFERENCE TO RELATED APPLICATIONS

This application is a Continuation of application Ser. No. 15/915,525, filed on Mar. 8, 2018, which claims the benefit of Taiwan Patent Application No. 106110738, filed on Mar. 30, 2017, the entirety of which is incorporated by reference herein.

BACKGROUND OF THE INVENTION

Field of the Invention

The application relates in general to a lens driving module, and in particular, to a lens driving module which used to hold and move a lens.

Description of the Related Art

As technology has advanced, a lot of electronic devices (for example, cameras and smartphones) have incorporated the functionality of taking photographs and recording video. These electronic devices have become more commonplace, and have been developed to be more convenient and thin. More and more options are provided for users to choose from.

In some electronic devices, a lens driving module is disposed therein to adjust the focus of a lens. However, the driving force may be not sufficient due to the deviated assembly of the inner components of the lens driving module. Therefore, how to address the aforementioned problem has become an important issue.

BRIEF SUMMARY OF INVENTION

To address the deficiencies of conventional products, an embodiment of the invention provides a lens driving module for holding and moving a lens, including a lens holder, a first electromagnetic driving assembly disposed on the lens holder, a base, a second electromagnetic driving assembly disposed on the base, and a first elastic member. The lens holder has an accommodating space and a first surface, and the lens is disposed in the accommodating space. The base has a connecting surface and a first contacting surface. The connecting surface and the first contacting surface are coplanar. The second electromagnetic driving assembly is adjacent to the first electromagnetic driving assembly, and the first elastic member is connected to the connecting surface and the lens holder. When the lens holder contacts the base, the first surface contacts the first contacting surface.

In some embodiments, the connecting surface and the first contacting surface face the lens holder.

In some embodiments, the area of the first surface is greater than the area of the first contacting surface.

In some embodiments, the base further comprises a sticking surface and a recess, the second electromagnetic driving assembly is attached to the sticking surface, and the recess is disposed between the sticking surface and the first contacting surface.

In some embodiments, the recess is adjacent to a first side of the base, and a plurality of longitudinal members are formed in the recess, wherein the longitudinal members extend along the extending direction of the first side.

In some embodiments, the base further comprises an inclined surface connected to the sticking surface, and the sticking surface is disposed between the inclined surface and the recess.

In some embodiments, the first contacting surface is separated from the connecting surface.

In some embodiments, the lens holder further comprises a second surface, and the base further comprises an opening, a second contacting surface, a first side, and a second side connected to the first side, wherein the opening corresponds to the accommodating space, the first contacting surface is disposed between the opening and the first side, and the second contacting surface is disposed between the opening and the second side, wherein when the lens holder contacts the base, the second surface contacts the second contacting surface.

In some embodiments, the second contacting surface and the connecting surface are coplanar.

In some embodiments, the second contacting surface faces the lens holder.

In some embodiments, the second contacting surface is separated from the connecting surface.

In some embodiments, the lens holder further comprises a third surface, and the base further comprises a third contacting surface disposed between the first contacting surface and the second contacting surface, wherein when the lens holder contacts the base, the third surface contacts the third contacting surface.

In some embodiments, the third contacting surface and the connecting surface are coplanar.

In some embodiments, the distance between the first contacting surface and the third contacting surface is greater than the distance between the second contacting surface and the third contacting surface.

In some embodiments, the third contacting surface is separated from the connecting surface.

In some embodiments, the third contacting surface has an L-shaped structure.

In some embodiments, the lens holder further comprises an opening corresponding to the accommodating space, and the first contacting surface is communicated with the opening.

In some embodiments, the base substantially has a rectangular structure.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
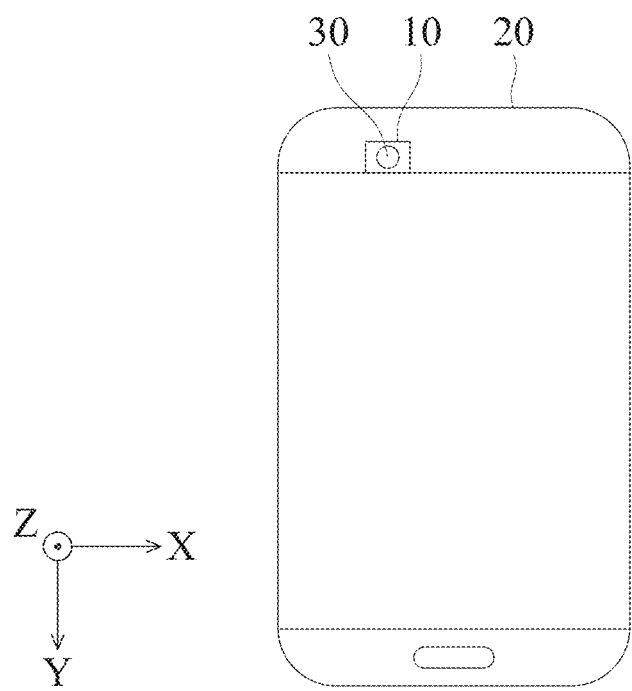
FIG. 1 is a schematic diagram of an electronic device according to an embodiment of the invention.

Referring to FIG. 1, in an embodiment of the invention, the lens driving module 10 can be disposed in an electronic device 20 and used to hold and drive a lens 30, so that the lens 30 can move relative to an image sensor in the electronic device 20, and the purpose of focus adjustment can be achieved. For example, the electronic device 20 can be a digital camera or a smart phone having the function of capturing photographs or making video recordings.

Figure 2:
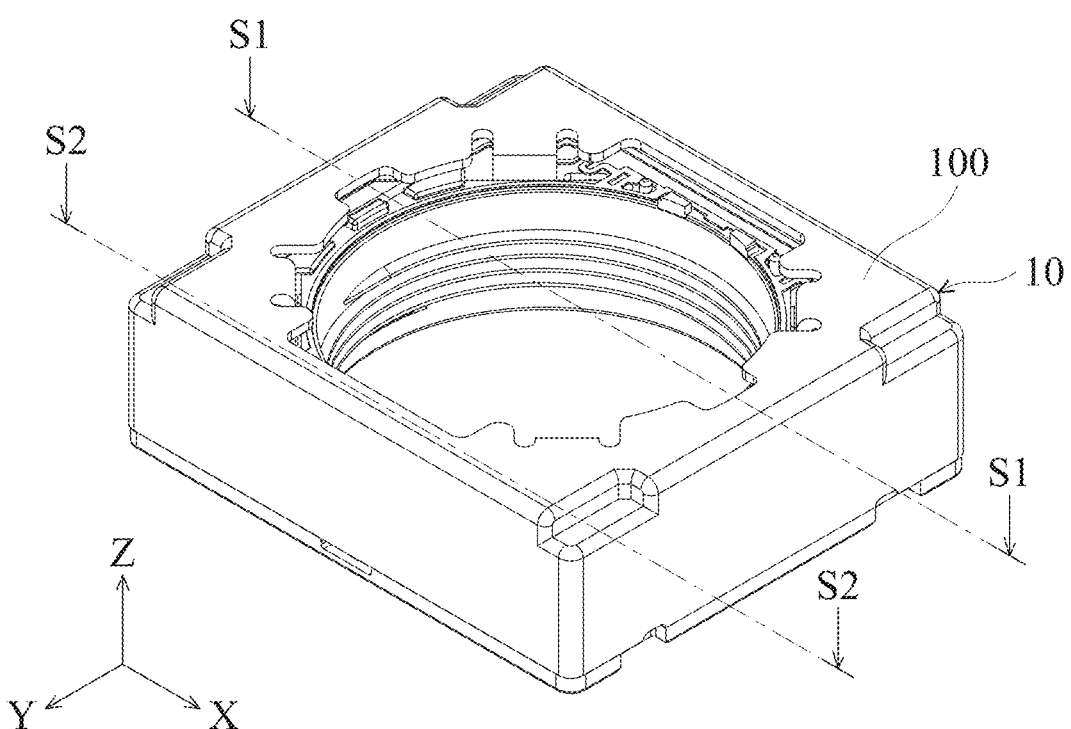
FIG. 2 is a schematic diagram of a lens driving module according to an embodiment of the invention.
Figure 3:
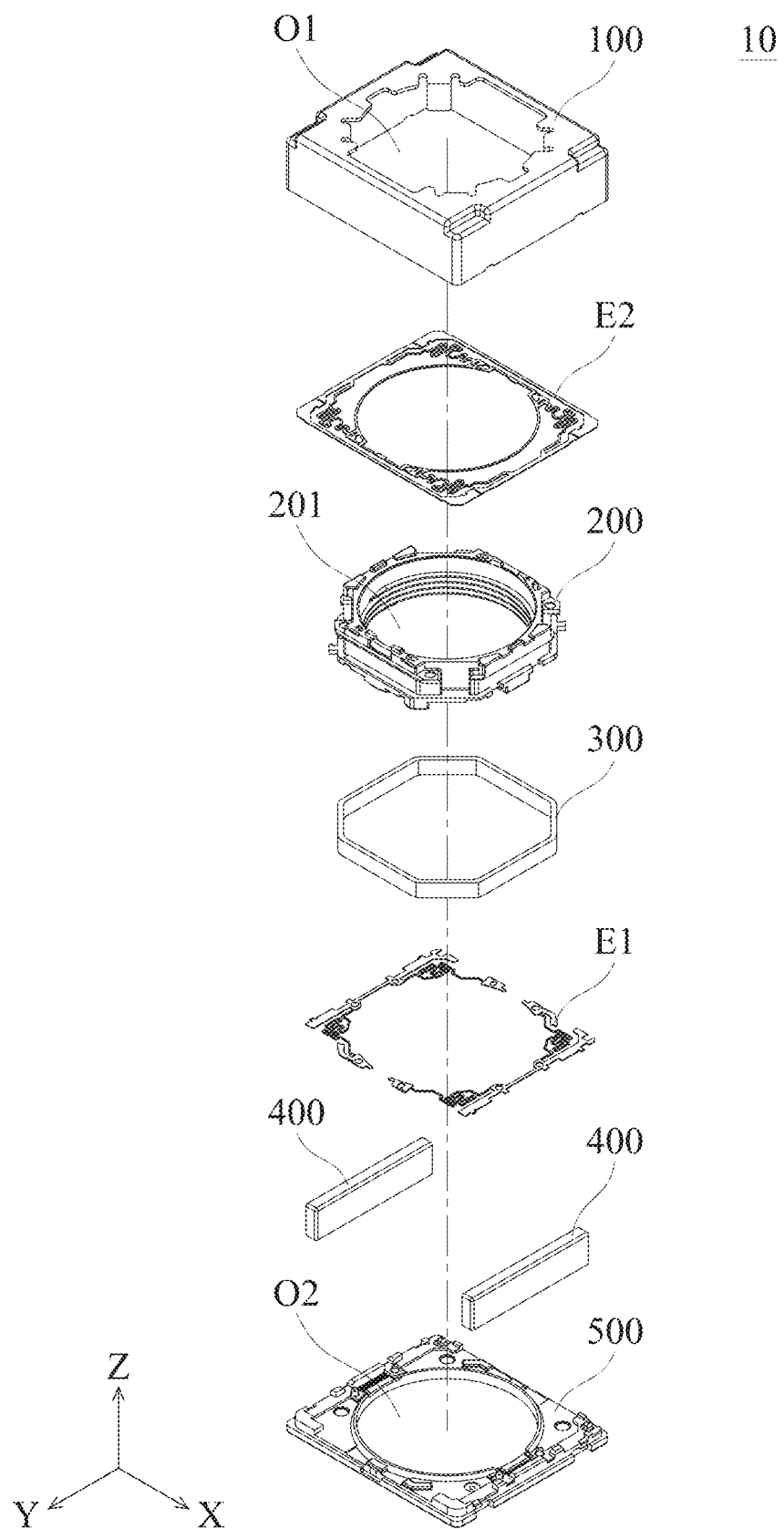
FIG. 3 is an exploded-view diagram of a lens driving module according to an embodiment of the invention.

FIG. 2 is a schematic diagram of the lens driving module 10, and FIG. 3 is an exploded-view diagram thereof. As shown in FIGS. 2 and 3, the lens driving module 10 primarily comprises an upper housing 100, a lens holder 200, at least one first electromagnetic driving assembly 300, at least one second electromagnetic driving assembly 400, a base 500, a first elastic member E1, and a second elastic member E2. The upper housing 100 and the base 500 can be assembled and form a hollow box, and the lens holder 200, the first electromagnetic driving assembly 300, the second electromagnetic driving assembly 400, the first elastic member E1, and the second elastic member E2 can be disposed in the hollow box.

An accommodating space 201 is formed at the center of the lens holder 200. The lens 30 shown in FIG. 1 can be affixed on the lens holder 200 and accommodated in the accommodating space 201. The upper housing 100 and the base 500 respectively have an opening O1 and an opening O2, and both the openings O1 and O2 correspond to the accommodating space 201. The image sensor (not shown) in the electronic device 20 is usually disposed under the base 500 and affixed relative to the base 500. Therefore, external light can reach the image sensor through the opening O1, the lens 30, and the opening O2 in sequence, so as to form an image on the image sensor.

Figure 4A:
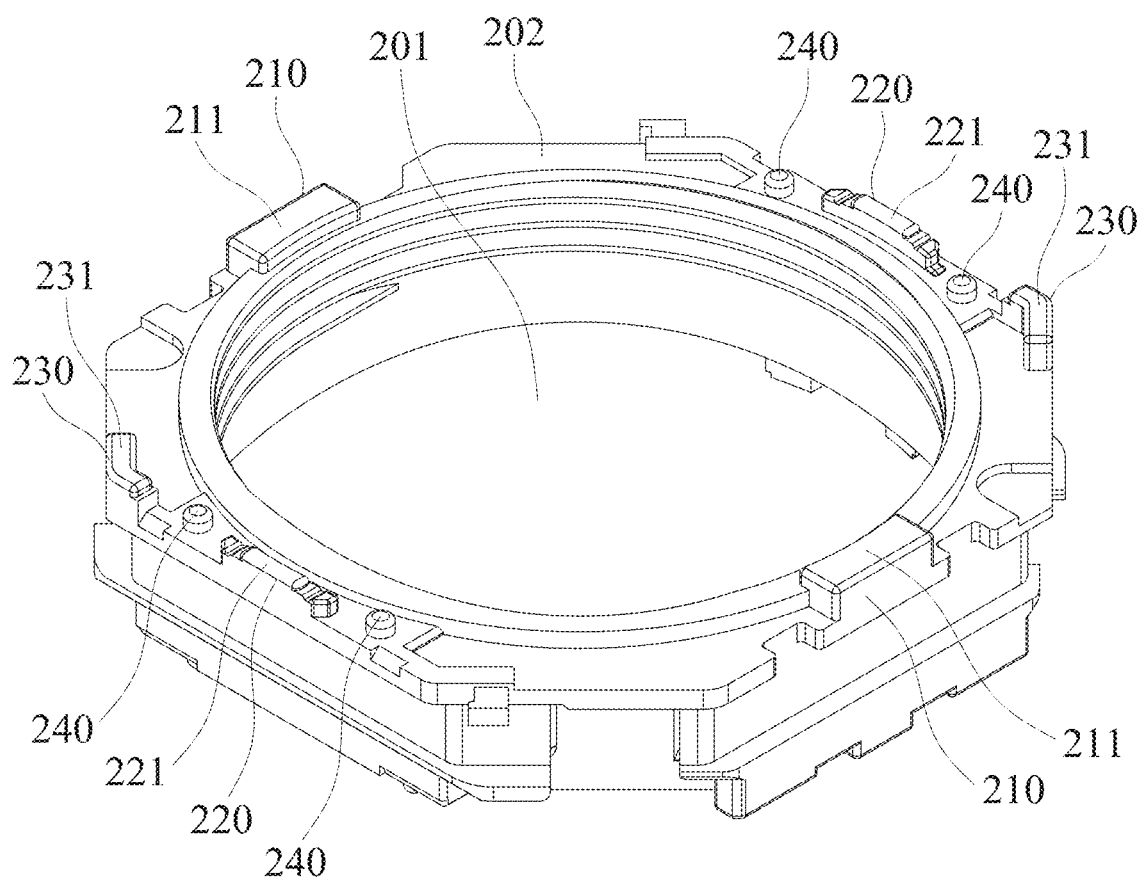
FIG. 4A is a schematic diagram of a lens holder according to an embodiment of the invention.
Figure 4B:
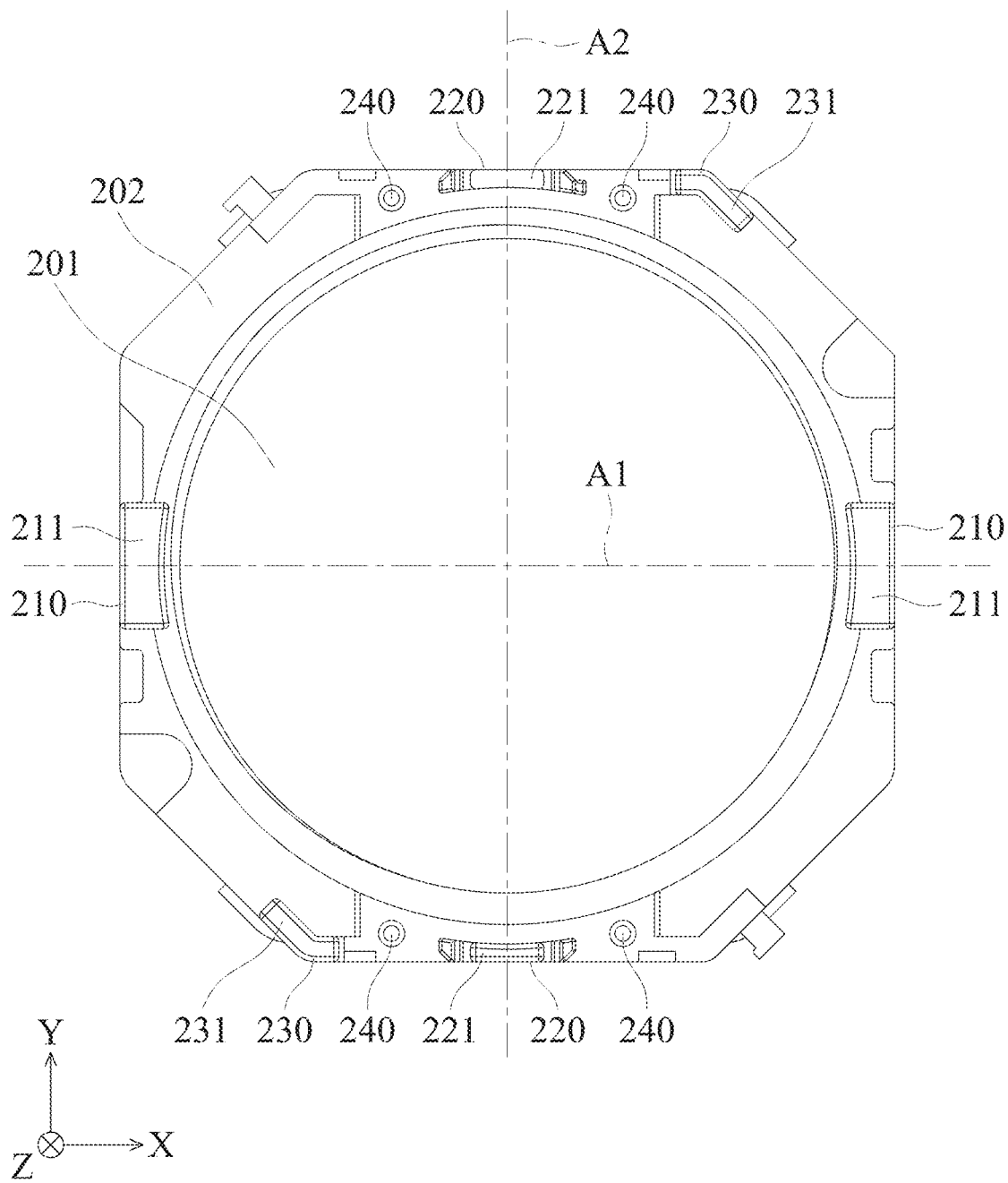
FIG. 4B is a bottom view of a lens holder according to an embodiment of the invention.

Referring to FIGS. 4A and 4B, at least one first protruding portion 210, at least one second protruding portion 220, and at least one third protruding portion 230 are formed on a lower surface 202 of the lens holder 200. The first protruding portion 210, the second protruding portion 220, and the third protruding portion 230 protrudes from the lower surface 202 and are separated from each other. The first protruding portion 210, the second protruding portion 220, and the third protruding portion 230 respectively have a first surface 211, a second surface 221, and a third surface 231 facing the base 500.

Specifically, the first surface 211, the second surface 221, and the third surface 231 are coplanar. That is, the distance between the first surface 211 and the lower surface 202 is the same as the distance between the second surface 221 and the lower surface 202, and is the same as the distance between the third surface 231 and the lower surface 202.

In this embodiment, the lens holder 200 has two first protruding portions 210, two second protruding portions 220, and two third protruding portions 230. The first protruding portions 210, the second protruding portions 220, and the third protruding portions 230 are adjacent to the periphery of the lens holder 200. The accommodating space 201 is disposed between two first protruding portions 210, two second protruding portions 220, and two third protruding portions 230. The central axis A1 of the lens holder 200 extending along the X-axis passes through two first protruding portions 210, and the central axis A2 extending along the Y-axis passes through two second protruding portions 220. Each of the third protruding portions 230 is disposed between one of the first protruding portions 210 and one of the second protruding portions 220. The distance between the third protruding portion 230 and the first protruding portion 210 is greater than the distance between the third protruding portion 230 and the second protruding portion 220.

It should be noted that, the third protruding portion 230 is merely disposed on one side of each of the first protruding portion 210, and the space on the other side of the first protruding portion 210 can be used to receive the first elastic member E1. Furthermore, a plurality of connecting pillars 240 are formed on the lower surface 202 of the lens holder 200, and close to the second protruding portions 220.

Figure 5:
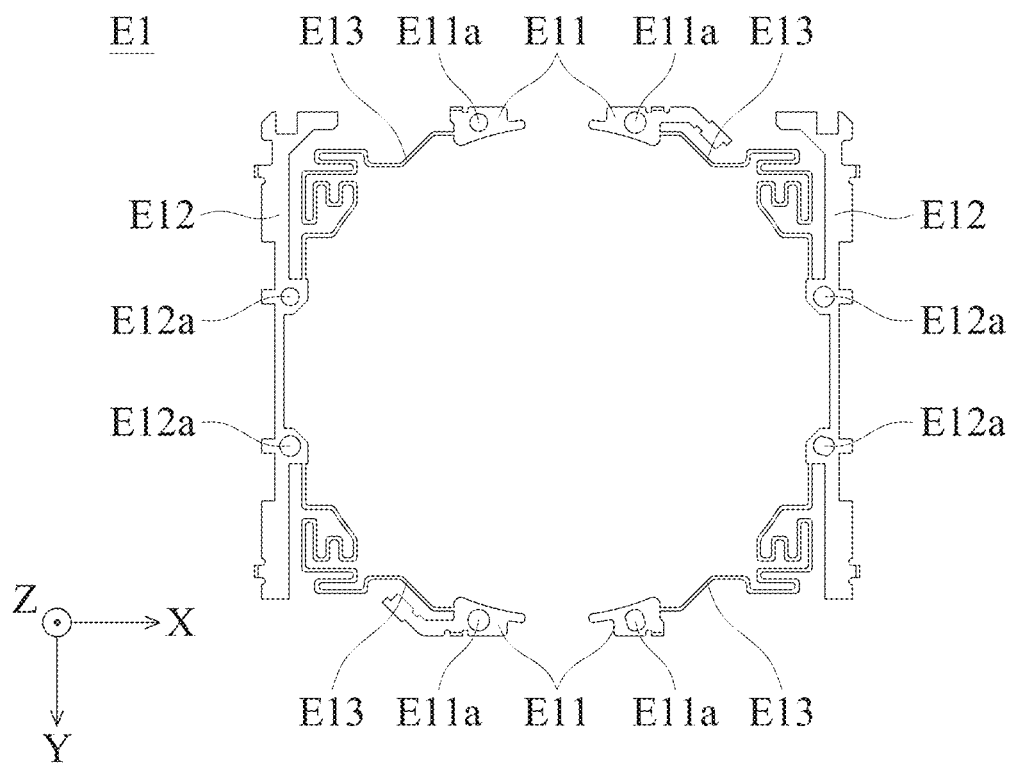
FIG. 5 is a schematic diagram of a first elastic member according to another embodiment of the invention.

Referring to FIGS. 3-5, the first elastic member E1 comprises at least one first fixed portion E11, at least one second fixed portion E12, and at least one string portion E13. The string portion E13 is connected to the first fixed portion E11 and the second fixed portion E12, and the first fixed portion E11 and the second fixed portion E12 are respectively affixed to the lower surface 202 of the lens holder 200 and the base 500 by sticking or using a locking member (for example, by using a screw).

The surface area of the first fixed portion E11 and the second fixed portion E12 is greater than that of the string portion E13, therefore, the sticking area of the first fixed portion E11 and the second fixed portion E12 can be increased, or more locking members can be disposed. The loosen of the first and second fixed portions E11 and E12 due to the movement of the lens holder 200 relative to the base 500 can be avoided.

When the first fixed portion E11 is affixed on the lens holder 200, the connecting pillar 240 is extended through the hole E11a on the first fixed portion E11, such that the first elastic member E11 can be easily positioned.

Figure 6:
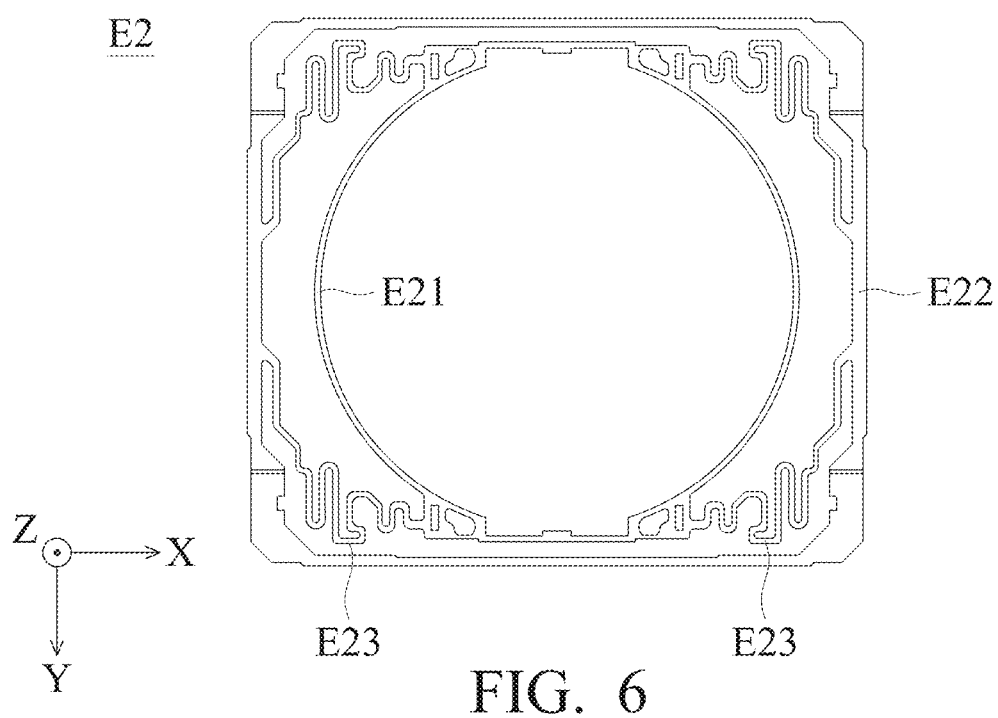
FIG. 6 is a schematic diagram of a second elastic member according to another embodiment of the invention.

As shown in FIGS. 3 and 6, the second elastic member E2 comprises an inner portion E21, an outer portion E22, and at least one string portion E23, wherein the string portion E23 is connected to the inner portion E21 and the outer portion E22. The inner portion E21 is affixed on the upper surface of the lens holder 200, and the outer portion E22 is fixed on the upper housing 100.

The lens holder 200 can be hung in the box formed by the upper housing 100 and the base 500 by the first elastic member E1 and the second elastic member E2. Moreover, when the lens holder 200 moves relative to the base 500, the first elastic member E1 and the second elastic member E2 are deformed and provides elastic force, and the range of motion of the lens holder 200 in the direction of the Z-axis can be restricted.

As shown in FIG. 3, the first electromagnetic driving assembly 300 is disposed on the lens holder 200, and the second electromagnetic driving assembly 400 is disposed on the base 500 and adjacent to the first electromagnetic driving assembly 300. The lens holder 200 can be driven to move relative to the base 500 along the Z-axis by electromagnetic effect between the first electromagnetic driving assembly 300 and the second electromagnetic driving assembly 400.

For example, in this embodiment, the first electromagnetic driving assembly 300 is a driving coil surrounding the accommodating space 201 of the lens holder 200, and the second electromagnetic driving assembly 400 comprises two magnets. When a current flows through the driving coil (the first electromagnetic driving assembly 300), electromagnetic effect is generated between the driving coil and the magnets. Thus, the lens holder 200 and the lens 30 disposed thereon can be driven to move upwardly or downwardly relative to the base 500 and the image sensor along the Z-axis, and the purpose of focus adjustment can be achieved.

In some embodiments, the first electromagnetic driving assembly 300 can be a magnet, and the second electromagnetic driving assembly 400 can be a driving coil.

Figure 7A:
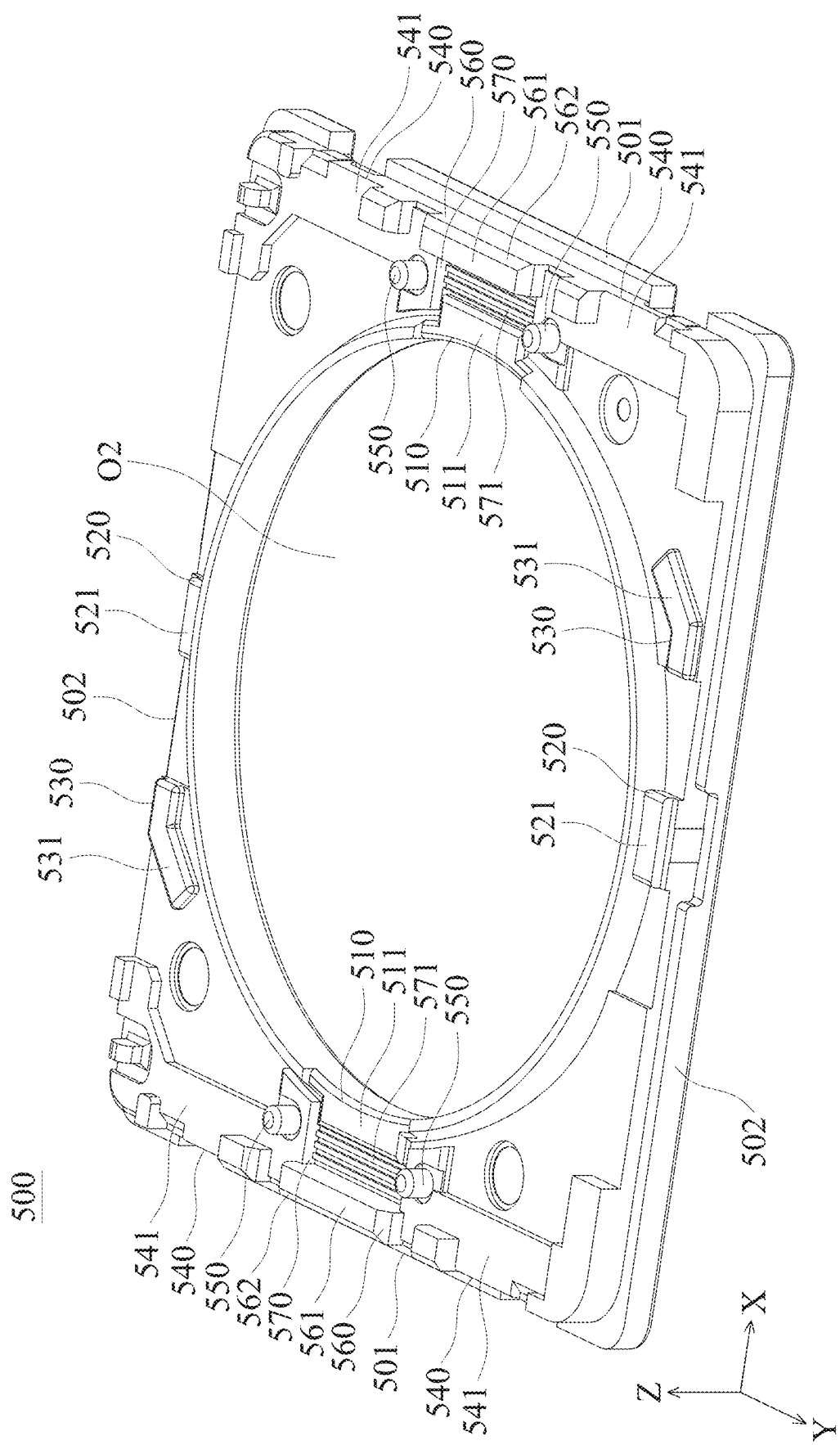
FIG. 7A is a schematic diagram of a base according to another embodiment of the invention.
Figure 7B:
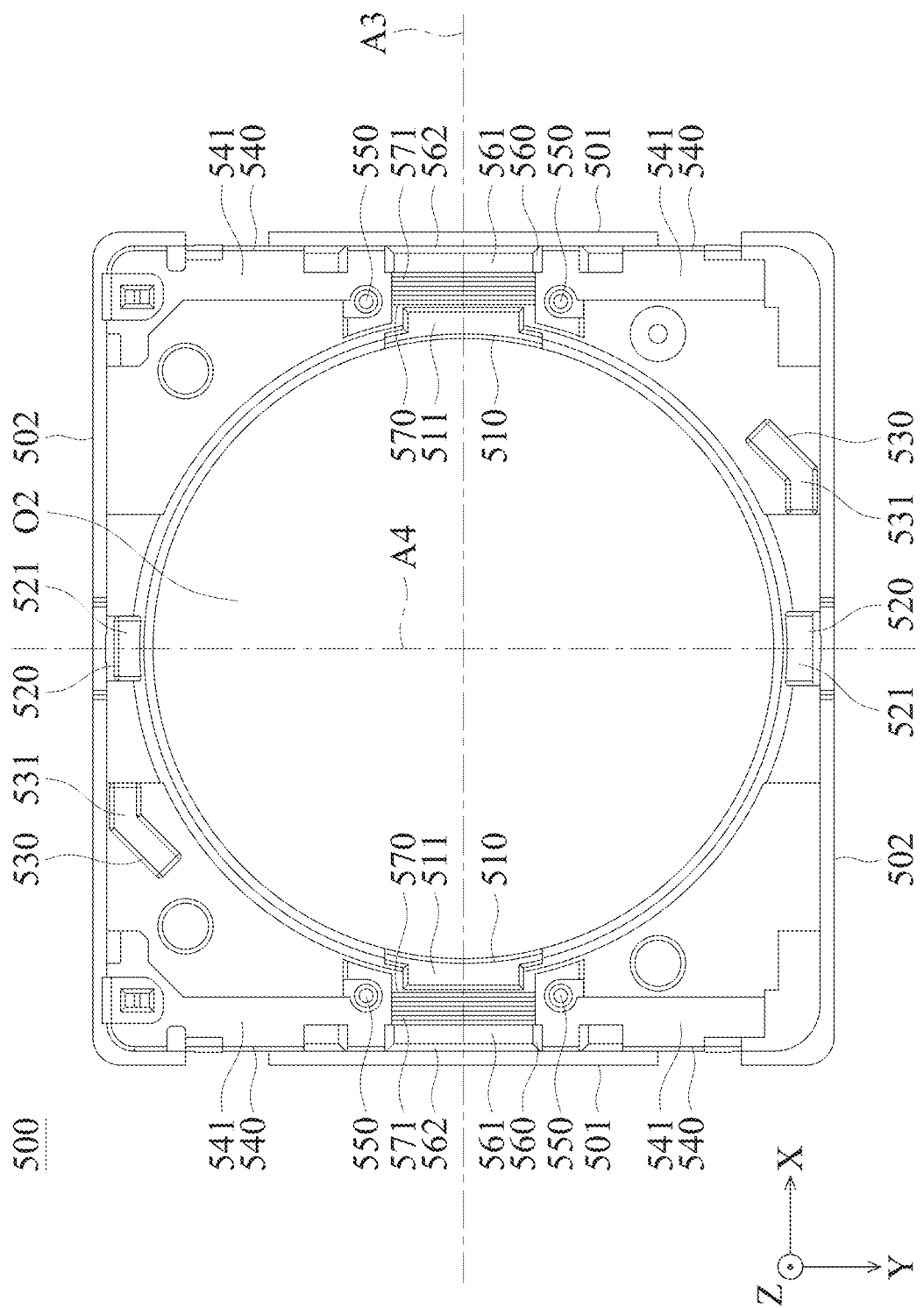
FIG. 7B is a top view of a base according to another embodiment of the invention.

Referring to FIGS. 7A and 7B, the base 500 of the lens driving module 100 comprises two first sides 501, two second sides 502, at least one first protrusion 510, at least one second protrusion 520, at least one third protrusion 530, at least one platform 540, a plurality of poles 550, at least one lateral wall 560, and least one recess 570. Two first sides 501 is situated at the opposite sides of the base 500, the second sides 502 is also situated at the opposite sides of the base 500, and the first sides 501 is connected to the second sides 502. The length of the second side 502 is greater than that of the first side 501. Thus, the base 500 substantially has a rectangular structure.

The first protrusion 510, the platform 540, the poles 550, the lateral wall 560, and the recess 570 are adjacent to the first side 501, and the second protrusion 520 is adjacent to the second side 502.

The first protrusion 510, the second protrusion 520, and the third protrusion 530 respectively have a first contacting surface 511, a second contacting surface 521, and a third contacting surface 531 facing the lens holder 200. The first protrusion 510, the second protrusion 520, and the third protrusion 530 are separated from each other. The first contacting surface 511 is disposed between the opening O2 and the first side 501, the second contacting surface 521 is disposed between the opening O2 and the second side 502, and the third contacting surface 531 is disposed between the first contacting surface 511 and the second contacting surface 521.

It should be noted that, the third contacting surface 531 substantially has an L-shaped structure, and the distance between the third contacting surface 531 and the first contacting surface 511 is greater than the distance between the third contacting surface 531 and the second contacting surface 521. Furthermore, the first contacting surface 511 is communicated with the opening O2, which is at the center of the base 500, and the second contacting surface 521 is separated from the opening O2.

In this embodiment, two first protrusions 510, two second protrusions 520, and two third protrusions 530 are formed on the base 500 of the lens driving module 10. The opening O2 is disposed between two first contacting surfaces 511, two second contacting surfaces 521, and two third contacting surfaces 531. The central axis A3 of the base 500 extending along the X-axis passes through two first protrusions 511, and the central axis A4 extending along the Y-axis passes through two second protruding portions 521. The third protrusion 530 is merely disposed on one side of each of the first protrusions 510, and the space on the other side of the first protrusion 510 can be used to receive the first elastic member E1.

Referring to FIGS. 7A and 7B, the platform 540 has a connecting surface 541 facing the lens holder 200, and the second fixed portion E12 of the first elastic member E1 is affixed on the connecting surface 541 by sticking or using the locking member. It should be noted that the connecting surface 541, the first contacting surface 511, the second contacting surface 521, and the third contacting surface 531 are coplanar.

As shown in FIG. 7A, the poles 550 protrude from the connecting surface 540. When the second fixed portion E12 is affixed on the connecting surface 541, the poles 550 extend through the holes E12a on the second fixed portion E12, such that the second fixed portion E12 can be easily positioned.

The lateral wall 560 is connected to the platform 540, and has a sticking surface 561 and an inclined surface 562. The sticking surface 561 is disposed between the recess 570 and the inclined surface 562, and the recess 570 is disposed between the sticking surface 561 and the first contacting surface 511. The recess 570 is surrounded by the lateral wall 560, the platform 540, and the first protrusion 510. Referring to FIG. 7A, a plurality of longitudinal members 571 are formed in the recess 570, extended along the extending direction of the first side 501, and separated from each other.

The second electromagnetic driving assembly 400 is attached to the sticking surface 561 of the lateral wall 560 by adhesive glue. When the user applies the adhesive glue on the sticking surface 561, a portion of the adhesive glue flows along the inclined surface 562 toward the direction away from the first contacting surface 511. The glue flowing along the wall facing the first contacting surface 511 enters the recess 570 and is blocked by the longitudinal members 571. Therefore, the attachment between the glue and the lens holder 200 in assembly, which makes it so that the lens holder 200 cannot move, can be prevented.

Figure 8A:
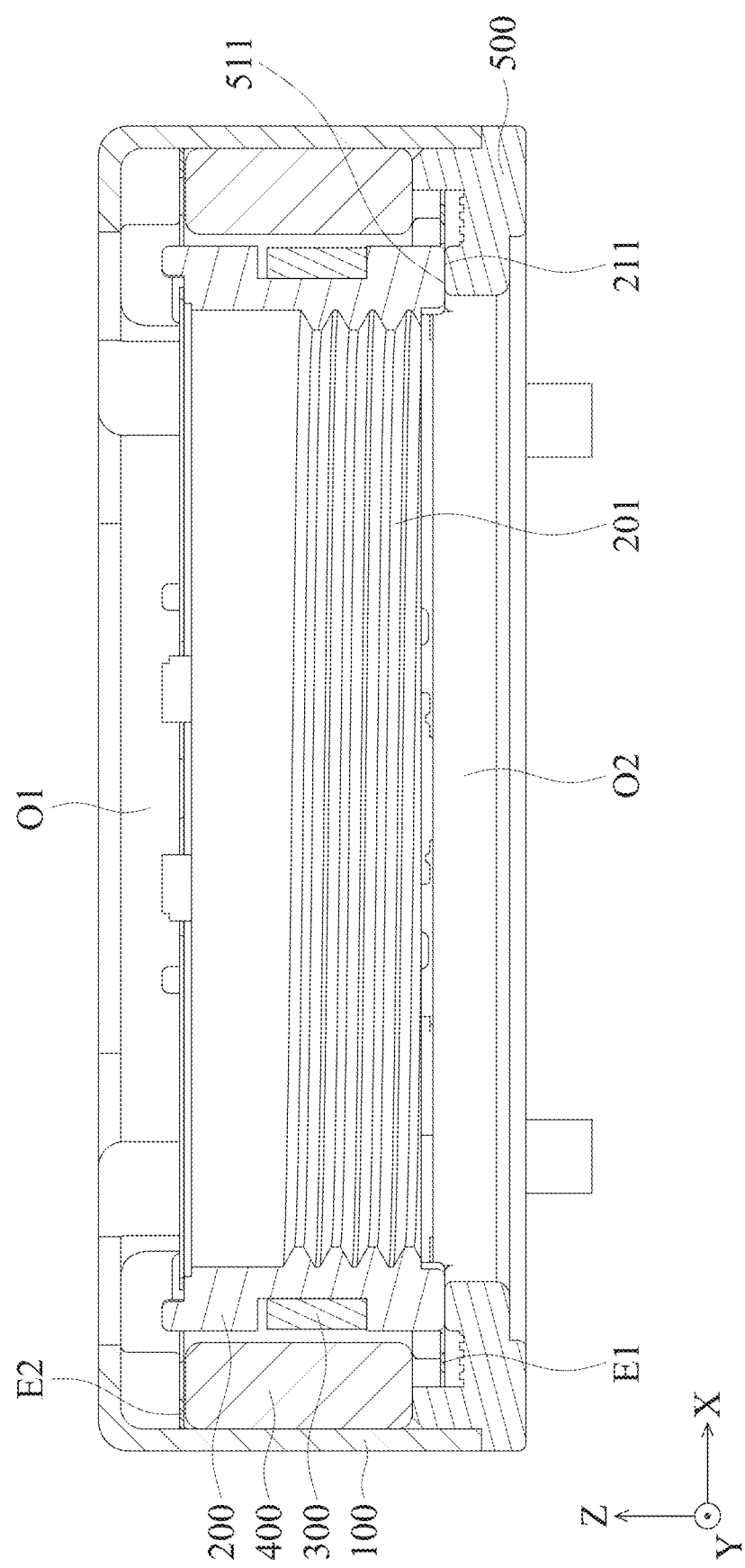
FIG. 8A is a cross-sectional view along line S1-S1 in FIG. 2.
Figure 8B:
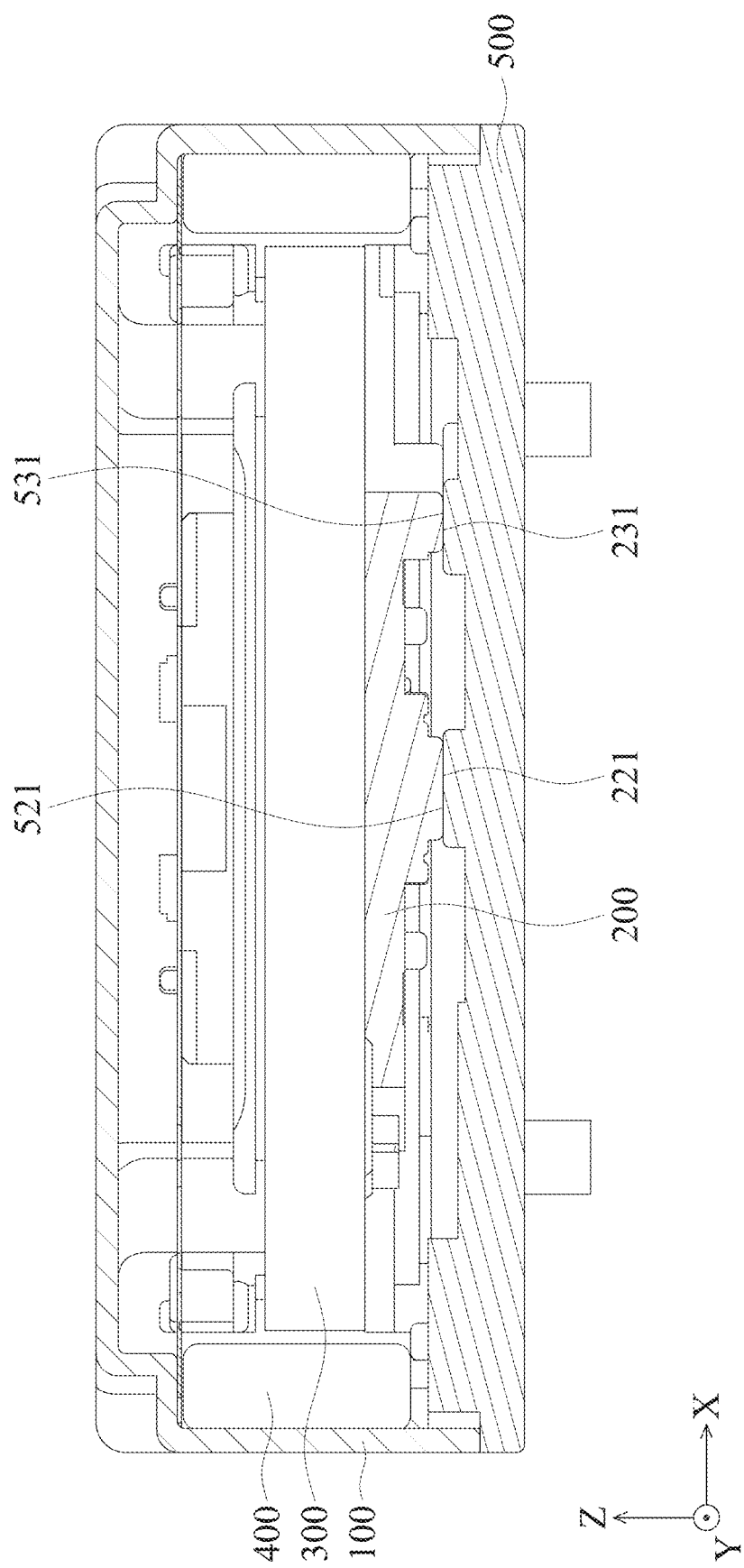
FIG. 8B is a cross-sectional view along line S2-S2 in FIG. 2.

Referring to FIGS. 8A and 8B, when the lens holder 200 contacts the base 500, the first contacting surface 511, the second contacting surface 521, and the third contacting surface 531 of the base 500 respectively contact the first surface 211, the second surface 221, and the third surface 231 of the lens holder 200.

Since the connecting surface 541, the first contacting surface 511, the second contacting surface 521, and the third contacting surface 531 are coplanar, any skew between the lens holder 200, the base 500, and the first elastic member E1 during assembly can be avoided.

Moreover, since the connecting surface 541, the first contacting surface 511, the second contacting surface 521, and the third contacting surface 531 are coplanar, when a plurality of lens driving modules are produced, the driving force in these lens driving modules are substantially the same.

As shown in FIG. 8A, the area of the first surface 211 on the lens holder 200 is greater than the area of the first contacting surface 511 on the base 500 communicating with the opening O2. Thus, any scraping that may occur due to the staggering motion that takes place when the lens holder 200 contacts the base 500 can be prevented, and a lens having a large thickness and focus can pass the opening O2 and is not restricted by the base 500.

In summary, a lens driving module having a lens holder and a base is provided. The lens holder has a plurality of surfaces separated from each other (the first surface, the second surface, and the third surface), and the base has at least one connecting surface and a plurality of contacting surfaces (for example, the first contacting surface, the second contacting surface, and the third contacting surface), which are coplanar and separated from each other. The first elastic member in the lens driving module is connected to the connecting surface and the lens holder. When the lens holder contacts the base, the surface of the lens holder contacts the contacting surface of the base, so as to prevent any skew between the lens holder 200, the base 500, and the first elastic member E1.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable portion, configured to connect an optical member having an optical axis;
   a fixed portion, wherein the movable portion is movable relative to the fixed portion;
   a driving assembly, configured to drive the movable portion to move relative to the fixed portion; and
   a stopping assembly, configured to restrict the movement of the movable portion relative to the fixed portion, wherein the stopping assembly comprises:
      a first surface;
      a first contacting surface, wherein when the movable portion contacts the fixed portion, the first surface contacts the first contacting surface;
      a second surface; and
      a second contacting surface, wherein when the movable portion contacts the fixed portion, the second surface contacts the second contacting surface;
   wherein the first surface and the second surface face the same direction, and the area of the first surface is different from the area of the second surface.

2. The optical member driving mechanism as claimed in claim 1, wherein the first surface and the optical axis are not overlapped as seen from an arrangement direction of the first surface and the second surface, and the second surface and the optical axis are not overlapped as seen from the arrangement direction of the first surface and the second surface.

3. The optical member driving mechanism as claimed in claim 1, wherein the stopping assembly further comprises a plurality of first surfaces and a plurality of first contacting surfaces, and the first surfaces and the optical axis are overlapped as seen from an arrangement direction of the first surfaces.

4. The optical member driving mechanism as claimed in claim 1, wherein the fixed portion includes a polygon structure, and the polygon structure has a first side and a second side disposed around the optical axis, wherein the length of the second side is greater than the length of the first side.

5. The optical member driving mechanism as claimed in claim 4, wherein the stopping assembly further comprises a plurality of first surfaces, and the longitudinal axis of the second side is parallel to an arrangement direction of the first surfaces.

6. The optical member driving mechanism as claimed in claim 4, wherein the first surface has a longitudinal structure as seen from the optical axis, and the second surface has an another longitudinal structure as seen from the optical axis, wherein the extending direction of the longitudinal axis of the first surface is different from the extending direction of the longitudinal axis of the second surface.

7. The optical member driving mechanism as claimed in claim 1, wherein the first surface and the second surface are formed on the movable portion, and the first contacting surface and the second contacting surface are formed on the fixed portion.

8. The optical member driving mechanism as claimed in claim 7, wherein the fixed portion comprises a sticking surface and a recess, the driving assembly is attached to the sticking surface, and the recess is disposed between the sticking surface and the first contacting surface.

9. The optical member driving mechanism as claimed in claim 8, wherein the recess is adjacent to a first side of the fixed portion, and a plurality of longitudinal members are disposed in the recess, wherein the longitudinal members extend along the extending direction of the first side.

10. The optical member driving mechanism as claimed in claim 8, wherein the fixed portion comprises an inclined surface connected to the sticking surface, and the sticking surface is disposed between the inclined surface and the recess.

11. An optical member driving mechanism, comprising:
    a movable portion, configured to connect an optical member having an optical axis;
    a fixed portion, wherein the movable portion is movable relative to the fixed portion;
    a driving assembly, configured to drive the movable portion to move relative to the fixed portion; and
    a stopping assembly, configured to restrict the movement of the movable portion relative to the fixed portion, wherein the stopping assembly comprises:
       a first surface;

a first contacting surface, wherein when the movable portion contacts the fixed portion, the first surface contacts the first contacting surface;

a second surface;

a second contacting surface, wherein when the movable portion contacts the fixed portion, the second surface contacts the second contacting surface;

a third surface; and a third contacting surface, wherein when the movable portion contacts the fixed portion, the third surface contacts the third contacting surface;

wherein the first surface, the second surface and the third surface face the same direction, and shortest distance between the first surface and the second surface is different from the shortest distance between the first surface and the third surface.

12. The optical member driving mechanism as claimed in claim 11, wherein the first surface and the optical axis are not overlapped as seen from an arrangement of the first surface and the second surface, and the second surface and the optical axis are not overlapped as seen from the arrangement of the first surface and the second surface, wherein the first surface and the optical axis are not overlapped as seen from an arrangement of the first surface and the third surface, and the third surface and the optical axis are not overlapped as seen from the arrangement of the first surface and the third surface.

13. The optical member driving mechanism as claimed in claim 11, wherein the stopping assembly further comprises a plurality of first surfaces and a plurality of first contacting surfaces, and the first surfaces and the optical axis are overlapped as seen from an arrangement direction of the first surfaces.

14. The optical member driving mechanism as claimed in claim 11, wherein the fixed portion includes a polygon structure, and the polygon structure has a first side and a second side disposed around the optical axis, wherein the length of the second side is greater than the length of the first side.

15. The optical member driving mechanism as claimed in claim 14, wherein the stopping assembly further comprises a plurality of first surfaces, and the longitudinal axis of the second side is parallel to an arrangement direction of the first surfaces.

16. The optical member driving mechanism as claimed in claim 14, wherein the first surface has a longitudinal structure as seen from the optical axis, and the second surface has an another longitudinal structure as seen from the optical axis, wherein the extending direction of the longitudinal axis of the first surface is different from the extending direction of the longitudinal axis of the second surface.

17. The optical member driving mechanism as claimed in claim 11, wherein the first surface, the second surface and the third surface are formed on the movable portion, and the first contacting surface, the second contacting surface and the third contacting surface are formed on the fixed portion.

18. The optical member driving mechanism as claimed in claim 17, wherein the fixed portion comprises a sticking surface and a recess, the driving assembly is attached to the sticking surface, and the recess is disposed between the sticking surface and the first contacting surface.

19. The optical member driving mechanism as claimed in claim 18, wherein the recess is adjacent to a first side of the fixed portion, and a plurality of longitudinal members are disposed in the recess, wherein the longitudinal members extend along the extending direction of the first side.

20. The optical member driving mechanism as claimed in claim 18, wherein the fixed portion comprises an inclined surface connected to the sticking surface, and the sticking surface is disposed between the inclined surface and the recess.

* * * * *